United States Patent
Logunov et al.

(10) Patent No.: US 8,777,135 B2
(45) Date of Patent: Jul. 15, 2014

(54) DEVICE AND METHOD FOR COOLING SOLID PARTICLES

(75) Inventors: Mekhti Logunov, Kharkov (UA); Alexander Katz, Donetsk (UA); Oleg Golobrodsky, Petach Tikva (IL); Gideon Drori, Sha'arei Tikva (IL)

(73) Assignee: Ecotech Recycling Ltd., Tel Aviv (IL)

( * ) Notice: Subject to any disclaimer, the term of this patent is extended or adjusted under 35 U.S.C. 154(b) by 405 days.

(21) Appl. No.: 13/054,199

(22) PCT Filed: Jul. 6, 2009

(86) PCT No.: PCT/IL2009/000672
§ 371 (c)(1),
(2), (4) Date: May 6, 2011

(87) PCT Pub. No.: WO2010/007616
PCT Pub. Date: Jan. 21, 2010

(65) Prior Publication Data
US 2011/0204165 A1 Aug. 25, 2011

(30) Foreign Application Priority Data
Jul. 14, 2008 (IL) .......................................... 192797

(51) Int. Cl.
*B02C 23/08* (2006.01)
(52) U.S. Cl.
USPC .................................. 241/23; 241/62; 241/65
(58) Field of Classification Search
USPC ............................ 241/60, 62, DIG. 37, 18, 23
See application file for complete search history.

(56) References Cited

U.S. PATENT DOCUMENTS

| | | | |
|---|---|---|---|
| 3,666,185 A * | 5/1972 | Williams | 241/17 |
| 4,273,294 A | 6/1981 | Hollely et al. | |
| 5,408,846 A | 4/1995 | Reali et al. | |
| 5,568,731 A | 10/1996 | Reali | |
| 5,729,986 A * | 3/1998 | Ko | 62/87 |
| 6,360,547 B1 | 3/2002 | Reznik | |
| 6,397,623 B1 | 6/2002 | Takachi | |
| 7,125,439 B2 | 10/2006 | Bennett | |
| 7,654,477 B2 * | 2/2010 | Tirelli et al. | 241/16 |
| 2004/0231342 A1 * | 11/2004 | Hong et al. | 62/62 |
| 2011/0204165 A1 | 8/2011 | Logunov et al. | |

FOREIGN PATENT DOCUMENTS

| | | |
|---|---|---|
| DE | 30 18 777 A1 | 11/1980 |
| DE | 3018777 A1 | 11/1980 |
| DE | 3018777 A1 * | 10/1999 |
| EP | 0947251 A2 * | 3/1998 |

(Continued)

OTHER PUBLICATIONS

Description of a Banbury Mixer.*

*Primary Examiner* — Faye Francis
(74) *Attorney, Agent, or Firm* — Novick, Kim & Lee, PLLC; Harold L. Novick; Jae Youn Kim

(57) ABSTRACT

A cooling arrangement adapted to be used in a process of preparing a fine powder, and a method for using same are described. The cooling arrangement (100) comprises: a solid particles feed ingress means, a solid particles mixing means (140), a plurality of cooling air discharging devices (130) and a solid particles egress means. The cooling arrangement is characterized in that the averaged diameter of the solid particles fed the said solid particles ingress means is essentially less than 6 mm. Preferably, the solid particles are fed to the cooling arrangement and free fall (120) onto the bottom section thereof.

13 Claims, 2 Drawing Sheets

(56) References Cited

FOREIGN PATENT DOCUMENTS

| EP | 0 947 251 A2 | 10/1999 |
| EP | 0947251 A2 | 10/1999 |
| EP | 1 213 114 A2 | 6/2002 |
| EP | 1213114 A2 * | 6/2002 | ............. B29B 17/00 |
| GB | 1 482 908 | 8/1977 |
| GB | 1482908 A | 8/1977 |

* cited by examiner

DEVICE AND METHOD FOR COOLING SOLID PARTICLES

FIELD OF INVENTION

The present invention relates to a method and apparatus for providing air at semi cryogenic temperatures during preparation of various products. In particularly, this invention relates to a method and apparatus for distributing air at semi cryogenic temperatures in cooling chambers during the process of preparing fine powders.

BACKGROUND OF THE INVENTION

One of the well known environmental challenges nowadays is the handling of used tires. There are estimations that at least one billion tires are discarded around the world every year. These scrap tires are an ecological predicament in all countries in which automobiles and trucks are a standard mode of transportation. Over the years, many more tires cast off in monumental piles than recycled or burned. It is estimated that in the US alone there are in excess of 1 billion tires in illegal tire piles, generating dangerous conditions of uncontrollable fires, air pollution as well as health hazards.

To date, most discarded tires were destined to be burned, assisting in alleviating an unending energy crisis. However, since the recognition by meteorologists of pending earth warming trends, burning tires is quickly becoming unacceptable solution and in some countries even illegal. Also, to date, many of the waste tires are simply shredded and buried in landfills. This too has become an undesirable solution as more and more countries recognize the danger in underground buried tires or tire parts, due to the adverse effect on the diminishing underground supplies of fresh water. Finally, tire piles serve as breeding grounds to colonies of disease infected rodents and incubation hot beds for dangerous and deadly insects. It is therefore clear that recycling must be the only acceptable and sustainable solution to the increasing problem of scrap tires.

Recognizing all of the above, several attempts have been made to reduce the increasing number of scrap tires discarded annually by recycling them. Tire recycling has traditionally been accomplished using three distinctly different technologies:

All mechanical ambient grinding the rubber;
Cryogenically, freezing and crushing the rubber; and
Pyrolysis or microwave treatment to melt rubber.

There are quite few aspects involved in the implementation of the second type of technology, namely, the cryogenically, freezing and crushing the rubber to produce granular rubber which may be used as a supplementary material in fuel or in road building, etc. One of the aspects involved in this technology is the step of exposing the crushed rubber to reduced temperatures e.g. to a point of embrittling the synthetic rubber.

Many conventional cryogenic recycling processes require the use of liquid nitrogen or solid carbon dioxide to lower the temperature of the material to be recycled to a point where a proceeding step of the process can yield a granular material such as a powder. However, such cryogenic processes are usually expensive to implement and to operate.

Many solutions were proposed in the past to improve this cooling step of the process. Few of these solutions are the following:

U.S. Pat. No. 4,273,294 discloses an improvement of conventional cryogenic grinding system incorporating an impact mill by providing means to allow at least 70% of the embrittled material entering the mill to bypass the mill's inlet and means to restrict the flow of the cold gas through the impact mill.

U.S. Pat. No. 5,408,846 describes a cooling device for lowering the temperature of rubber or polystyrene materials for recycling purposes. The cooling device has an input feeder which inputs the material to be treated into a cooling chamber. The cooling chamber is an elongated chamber. The cooling chamber receives cold air from an external air refrigeration unit and circulates that air within the chamber. The material input into the cooling chamber is circulated therein by a circulating shaft. After 15-20 minutes, the input material is discharged through an output on the opposite end of the cooling chamber. The material discharged temperature is $-80°$ C. or lower.

U.S. Pat. No. 5,568,731 discloses an ambient air freezing system for producing chilled air in the cryogenic range of $-120°$ C. to $-180°$ C. without the use of cryogenic chemicals or other refrigerants.

U.S. Pat. No. 6,360,547 describes a method for cryogenically freezing materials, such as rubber, food, plastics by compressing ambient air to a first level, cooling the air back to an ambient temperature, compressing the air again, and then cooling the air followed by expanding the compressed air thereby cooling it down to cryogenic temperatures that is fed to the material to be processed.

U.S. Pat. No. 6,397,623 describes a cooling device in which the compressor and the expander are coupled to one crank shaft or interlocked crank shafts so as to use the expansion energy from the compressed air in the expander as an energy for compressing the outside air in the compressor, thereby reducing the running cost.

U.S. Pat. No. 7,125,439 discloses a method for providing clean air to an environment, by cooling incoming air, which may be contaminated with chemical, nuclear or biological contamination and removing water from the cooled air. The cooled air is passed through a regenerative pressure swing absorption system which removes the contaminants. The resulting, cleaned, air is expanded by an expander and is provided to the environment.

SUMMARY OF THE INVENTION

It is an object of the present invention to provide a method and apparatus for efficiently lowering the temperature of used tires, rubber, polymeric materials and the like, to cryogenic levels.

It is another object of the present invention to provide a method and apparatus for rapid lowering the temperature of used tires, rubber, polymeric materials and the like, to cryogenic levels thereby reducing the period required for the material being cooled to remain within the cooling chamber.

It is still another object of the present invention to provide a method and apparatus for use in a process of producing fine powders.

Other objects of the present invention will become apparent from the following description.

According to a first embodiment of the invention, there is provided a cooling arrangement adapted for use in a process of producing fine powder, and comprising: a solid particles feed ingress means, a solid particles mixing means, a plurality of cooling air discharging devices and a solid particles egress means, and wherein the cooling arrangement is characterized in that the averaged diameter of the solid particles fed via the solid particles ingress means is essentially less than 6 mm.

According to a preferred embodiment of the invention, each of the plurality of the cooling air discharging devices is located at a side of the cooling arrangement different from any of the other air cooling air discharging devices, e.g. having one or more pairs of cooling air discharging devices where each pair's member located at an opposite wall than the other member of that pair.

By yet another preferred embodiment, each of the plurality of the cooling air discharging devices is an air compressing/expanding device.

In accordance with another preferred embodiment, the solid particles feed ingress means is located essentially at the top section of the cooling arrangement whereas the solid particles egress means is located essentially at the bottom section of that cooling arrangement.

By still another embodiment of the invention, the cooling arrangement is further adapted to allow the solid particles fed via the solid particles feed ingress means, to free fall onto the bottom section of the cooling arrangement, where preferably they are mixed by a mechanical mixing means for the rest of a pre-defined period of time, thereafter they are conveyed to the next step of the powder preparation process.

According to another aspect of the present invention there is provided a method for use in a process of producing a fine powder. The method comprises the steps of:

providing a plurality of solid particles having an averaged diameter of less than 6 mm;

feeding the plurality of solid particles into a cooling chamber;

mechanically mixing the solid particles during a pre-defined period of time while cooling them down by air provided via a plurality of cooling air discharging devices; and removing the cooled brittle solid particles out of the cooling chamber.

In accordance with another embodiment of this aspect of the invention, the method provided further comprising a step of cleaning and drying ambient air intake prior to introducing that ambient air to the plurality of the cooling air discharging devices.

Preferably, the temperature to which the solid particles are cooled down by the plurality of air cooling air discharging devices is in the range of −70° C. to −110° C.

By yet another embodiment, the method provided further comprises a step of allowing the solid particles to reach the bottom section of the cooling chamber by free fall from the top section thereof.

Preferably, the method provided is carried out as a batch process for a pre-defined period of time.

DETAILED DESCRIPTION OF A PREFERRED EMBODIMENT

A better understanding of the present invention is obtained when the following non-limiting detailed examples are considered in conjunction with the accompanying drawings.

As previously discussed, one of the objects of the present invention is to provide method and means to cool down solid particles such as recycled tires particles so that the end product of the whole recycling process, of which the cooling process described and claimed herein is a part, are particles that are in a form of fine or even ultrafine powder, typically particles of 1μ or less, as the unique way of cooling provided by the present invention results in frozen and highly brittle particles which may easily be pulverized into a fine or even ultrafine particles. Although various processes were suggested in the past to produce fine powders, still, they are rather expensive to operate as they either make use of refrigerants or cryogenic chemicals, or characterized by being an inefficient ambient grinding processes. Due to high production cost and other inefficiencies, ultra fine products have not been produced in large quantities from recycled materials. The solution provided by the present invention aims to overcome these obstacles.

Although the invention is described hereinafter in connection with a process of recycling synthetic rubber such as rubber that originates from used tires, still, this is done for the convenience of the reader and the scope of the invention should not be understood to be restricted to that specific process.

Figure 1:
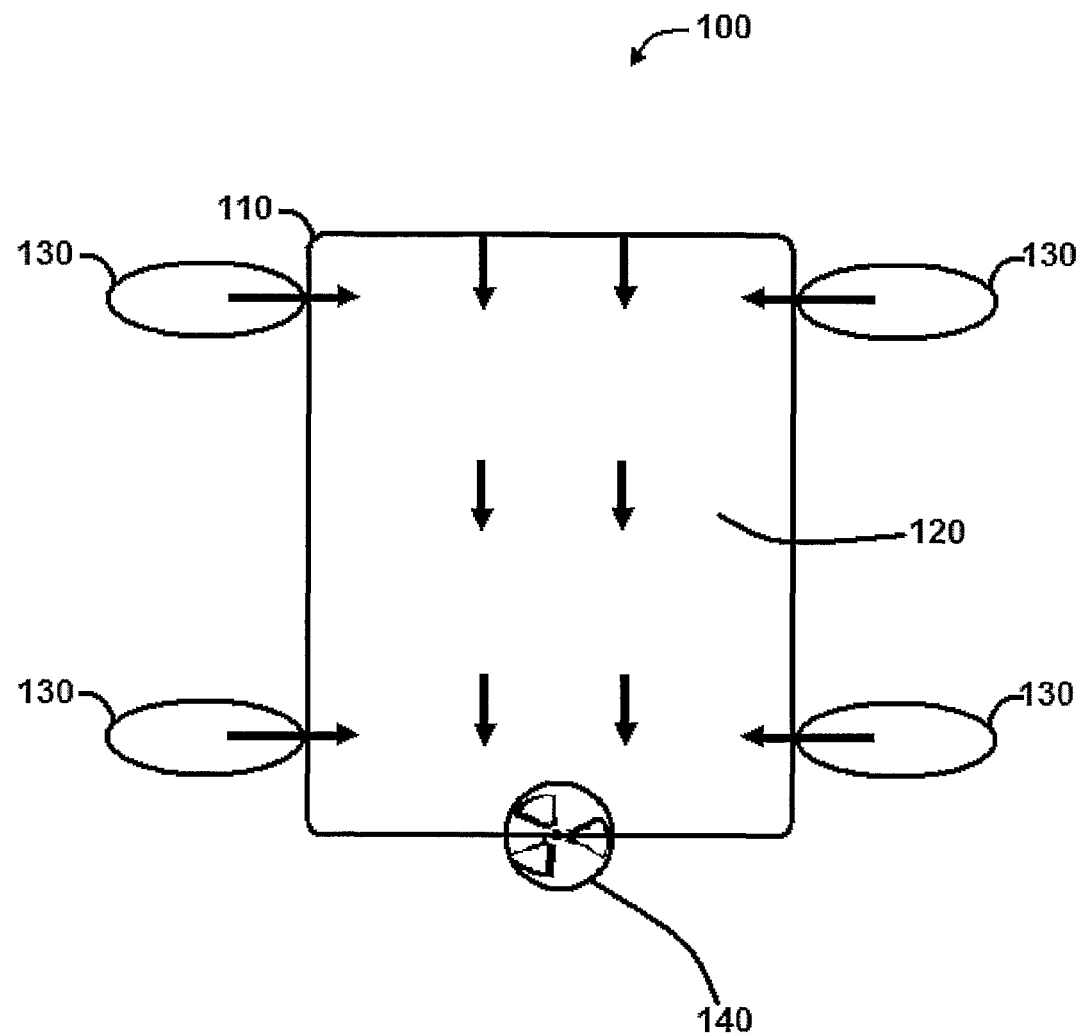
FIG. 1 illustrates a schematic diagram of the cooling arrangement according to the present invention for air cooling particles in a batch operation to cryogenic temperatures.

Turning now to the drawings, FIG. 1 illustrates a cooling arrangement 100 to which a pre-defined quantity (e.g. by weight) of synthetic rubber particles derived from processing used tires is conveyed by using any applicable solids conveying means known in the art per se such as conveying belt (not shown in this Fig.). Typically, the particles which are of an averaged diameter in the range of 1 to 5 mm are fed into the top section of chamber 110, and they free fall 120 to the bottom of chamber 110, where they are subjected to mixing operation of mixer/stirrer 140. During their fall, there is an initial cooling of the particles. The mixer/stirrer (e.g. a rotary device) operates to ensure that no big lumps of particles are formed and that all the particles will be subjected to the cooling air, in order to obtain a substantially homogenous temperature at the range of −80° C. to −100° C. of the synthetic rubber particles present in the chamber. Once the quantity of particles is introduced into the chamber, it is closed and preferably sealed, and a plurality of cooling air discharging devices 130 are operative to cool down the particles. Four such cooling air discharging devices are illustrated in FIG. 1, demonstrating the introduction of cooling air from each side of the chamber. The air reaching each of these cooling air discharging devices is preferably cleaned, dried and compressed prior to reaching the air discharging devices, although in the alternative all these operations can be carried out within the cooling air discharging devices themselves and hence this alternative should also be considered to be encompassed by the present invention. In the present example, the cooling air is introduced to the chamber at −90° C. and at a pressure of few atmospheres. When introduced into the chamber, the air expands, thereby causing its own temperature to further reduce. The discharge section of each of the cooling air discharging devices is preferably designed to blow air somewhat above the particles being mixed/stirred to avoid too much turbulences among the particles that might results in particles flowing all over the chamber, but near enough to the particles to get an efficient cooling thereof. Typically, the particles stay in the chamber for about 10 to 15 minutes. Thereafter, the particles are discharged at the chamber's bottom section airlock after they have become brittle and consequently easy to pulverize, to another solid conveying means for further processing the frozen granules, e.g. they can then be further ground or crushed to produce the desired ultra fine powder.

Although the present invention was described in the above example in connection with synthetic rubber particles obtained from used tires, as will be understood by those skilled in the art it can be used for cryogenically cooling materials such as polymers, rubber based materials and the like without using refrigerants or cryogenic chemicals in the process.

In order to obtain the cooling air required for the process any method known in the art per se, that is applicable to produce the air at the right physical conditions of temperature and pressure and the right cleanness and dryness levels can be used. For example, by taking ambient air, compressing and expanding it by using multiple turbo expander machines. The oil resulting from the compression is removed and the air is cleaned and dried before compression. The cooled air may then be fed into the cooling chamber, after reaching a temperature of −80 to −100 degree C.

A suitable filter for the air preparation process could be an inertial separator. This may be achieved by passing the air through a filter, such as a Borosilicate micro-fiber filter, in which water, oil and particles are removed using a coalescing effect. Alternatively a silica gel or an activated alumina could be used as an adsorbent, so as to dry the air by chemically reacting to the water vapor in the air within the filter to adsorb and remove the water vapor.

Another option is using a thermodynamic cycle, otherwise known as the "Russian cycle", where the compressor and turbo expander are located in one cylinder and chamber connected horizontally with the motor so as to use the expansion energy from the compressed air in the expander as an energy for compressing the outside air in the compressor, thereby reducing the running cost. The unit is environmentally friendly low-temperature cycle (up to −110° C.) enclosed in one functional block aggregate, and can be fully automated.

As will be appreciated by those skilled in the art, although the particles themselves undergo a batch type of operation as they are maintained within the chamber for a predefined period of time, still, the discharge of the cooling air may be a continuous type of operation, as long as the particles are introduced and removed from the cooling chamber through sealed means such as airlocks.

Figure 2:
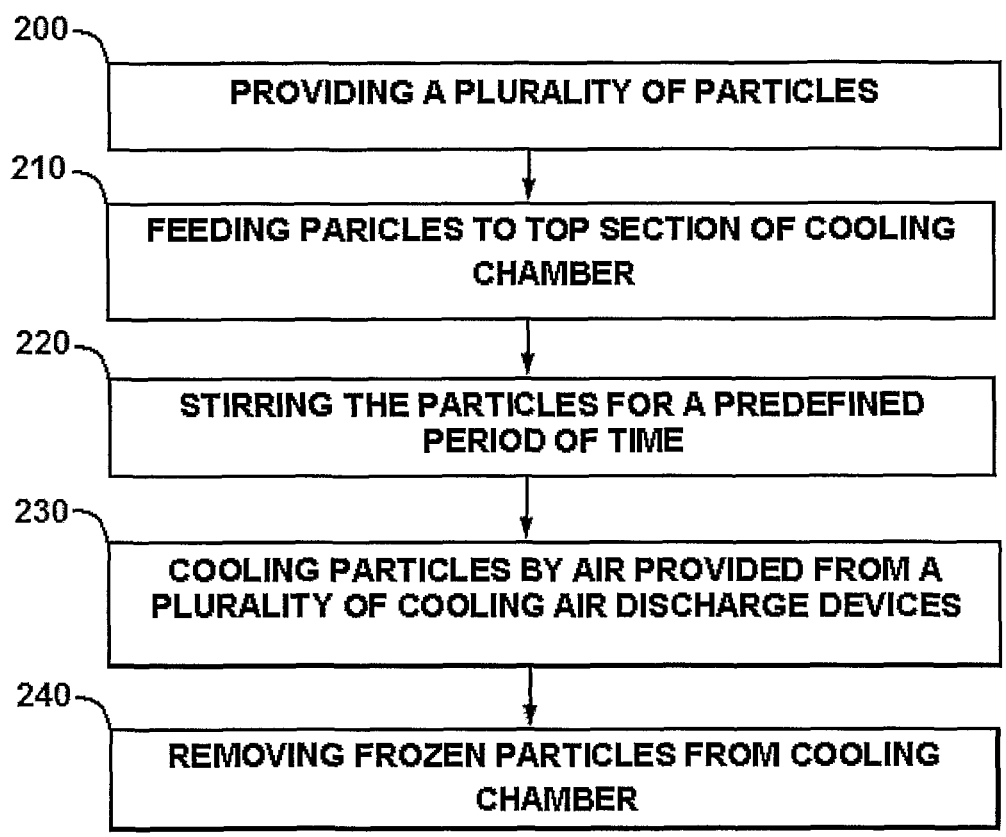
FIG. 2 exemplifies a method of carrying out the present invention.

FIG. 2 exemplifies a method for use in a process of cooling materials that eventually should be pulverized such as rubber based materials, polymers and the like, carried out according to the present invention. At first, a plurality of particles is provided (step 200) having an average diameter of less than 6 mm, and are preferably between 1 to 5 mm. The particles are fed through a top section of a cooling chamber (step 210) where they are allowed to free fall to the bottom section of the chamber. There they are mechanically stirred (step 220) for a pre-defined period of time of about 10-15 minutes while cooling the particles down by air provided via a plurality of air cooling air discharging devices (step 230). Upon expiring the pre-defined period of time, the frozen particles are removed (step 240) from the cooling chamber.

While only the above embodiments of the present invention have been illustrated and described, it is to be understood that many changes and modifications may be made thereto without departing from the spirit and scope of the invention as defined in the appended claims.

The present invention has been described using non-limiting detailed descriptions of preferred embodiments thereof that are provided by way of example and are not intended to limit the scope of the invention. It should be understood that features described with respect to one embodiment may be used with other embodiments. Variations of embodiments described will occur to persons of the art. Furthermore, the terms "comprise", "include", "have" and their conjugates shall mean, when used in the claims "including but not necessarily limited to". Also when term was used in the singular form it should be understood to encompass its plural form and vice versa, as the case may be.

The invention claimed is:

1. A cooling arrangement for use in a process of preparing a fine powder, and comprising:
   a vertical cooling chamber having a first opening at a top end portion and a second opening at a bottom end portion;
   a solid particles feed ingress mechanism that deposits solid particles having an averaged diameter of less than 6 mm in said first opening;
   a solid particles mechanical mixing mechanism located in said cooling chamber at the bottom end portion thereof;
   a plurality of cooling air discharging devices; and
   a solid particles egress mechanism in communication with said second opening that removes said solid particles,
   wherein said solid particles feed ingress mechanism is configured to enable the deposited solid particles to free fall from said first opening to said bottom end portion while being cooled during such free fall by the cooled air from said plurality of cooling air discharging devices, and the deposited fallen articles are mixed and stirred by said mechanical mixing mechanism so that no big lumps of particles are formed.

2. The cooling arrangement according to claim 1, wherein one of said plurality of cooling air discharging devices is located at a side of said cooling chamber different from another of said plurality of cooling air discharging devices.

3. The cooling arrangement according to claim 1, wherein the solid particles feed ingress mechanism is located essentially at a top section of said cooling arrangement whereas the solid particles egress mechanism is located essentially at a bottom section of said cooling arrangement.

4. The cooling arrangement according to claim 1, further configured to allow said solid particles fed through said solid particles feed ingress means to free fall onto a bottom section of said cooling arrangement.

5. A method for use in a process of preparing fine powdered material, and comprising the steps of:
   providing a plurality of solid particles having an averaged diameter of less than 6 mm;
   depositing said plurality of solid particles into a vertical cooling chamber having a first opening at a top end portion and a second opening at a bottom end portion;
   allowing said deposited solid particles to free fall within said cooling chamber;
   cooling the free falling solid particles in said cooling chamber;
   mechanically mixing said solid particles by a solid particles mechanical mixing mechanism located in said cooling chamber at the bottom end portion thereof for a pre-defined period of time; and
   removing the cooled solid particles out of said cooling chamber via a solid particles egress mechanism in communication with said second opening,
   wherein the solid particles are cooled during such free fall by cooled air from a plurality of cooling air discharging devices, and the deposited fallen particles are mixed and stirred by said mechanical mixing mechanism so that no big lumps of particles are formed.

6. The method according to claim 5, further comprising a step of cleaning and drying ambient air intake prior to introducing said ambient air to said plurality of cooling air discharging devices.

7. The method according to claim 5, wherein a temperature to which said solid particles are cooled down is in a range of −110° C. to −70° C.

8. The method according to claim 5, further comprising a step of allowing said solid particles to reach a bottom section of said cooling chamber by a free fall from a top section thereof.

9. The method according to claim 5, wherein said method is carried out as a batch process for the pre-defined period of time.

10. The cooling arrangement according to claim 1, wherein said mechanical mixing mechanism comprises a rotary device.

11. The cooling arrangement according to claim 1, wherein the averaged diameter of the solid particles fed via said solid particles ingress means is in a range of 1 mm to 5 mm.

12. The cooling arrangement according to claim 1, wherein the plurality of cooling air discharging devices comprises four cooling air discharging devices, a pair of the four cooling air discharging devices is disposed on one side of the chamber and another pair of the four cooling air discharging devices is disposed on an opposite side of the chamber.

13. The method according to claim 5, wherein the pre-defined period of time is about 10 to 15 minutes.

* * * * *